United States Patent
Kim et al.

(10) Patent No.: US 8,052,295 B2
(45) Date of Patent: Nov. 8, 2011

(54) BACKLIGHT ASSEMBLY AND LIQUID CRYSTAL DISPLAY DEVICE HAVING THE SAME

(75) Inventors: Hyung Dong Kim, Daegu-si (KR); Wook Jeon, Daejeon-si (KR)

(73) Assignee: LG Display Co., Ltd., Seoul (KR)

( * ) Notice: Subject to any disclaimer, the term of this patent is extended or adjusted under 35 U.S.C. 154(b) by 165 days.

(21) Appl. No.: 11/581,369

(22) Filed: Oct. 17, 2006

(65) Prior Publication Data

US 2007/0253219 A1 Nov. 1, 2007

(30) Foreign Application Priority Data

Apr. 28, 2006 (KR) .................. 10-2006-0038650

(51) Int. Cl.
*G09F 13/04* (2006.01)
*F21V 7/04* (2006.01)
(52) U.S. Cl. ....... 362/97.3; 362/632; 362/633; 362/225; 362/249.02

(58) Field of Classification Search .............. 362/29–30, 362/225, 231, 240, 612, 631–634, 97.2–97.3, 362/249.02
See application file for complete search history.

(56) References Cited

U.S. PATENT DOCUMENTS

| | | | |
|---|---|---|---|
| 7,207,709 B2 * | 4/2007 | Chuang et al. ................. | 362/633 |
| 2005/0002173 A1 | 1/2005 | Chuang et al. | |
| 2006/0012286 A1 | 1/2006 | Cull et al. | |
| 2006/0087866 A1 * | 4/2006 | Ng et al. ........................ | 362/612 |
| 2006/0203465 A1 * | 9/2006 | Chang et al. .................... | 362/29 |
| 2006/0232964 A1 * | 10/2006 | Hoshi et al. ................... | 362/231 |

* cited by examiner

*Primary Examiner* — Bao Q Truong
*Assistant Examiner* — Sean Gramling
(74) *Attorney, Agent, or Firm* — Birch, Stewart, Kolasch & Birch, LLP

(57) ABSTRACT

A backlight assembly and a liquid crystal display device having the same backlight assembly are provided. The backlight assembly includes a bottom case, a plurality of printed circuit boards (PCBs) disposed on the bottom case, wherein substantially all of the PCBs have predetermined inclinations with respect to a front surface of the bottom case, and a plurality of light emitting diodes (LEDs) mounted on the PCBs.

6 Claims, 6 Drawing Sheets

BACKLIGHT ASSEMBLY AND LIQUID CRYSTAL DISPLAY DEVICE HAVING THE SAME

The present application claims priority to Korean application No. 10-2006-38650, filed Apr. 28, 2006 in Korea, the entire contents of which are herein incorporated by reference.

BACKGROUND OF THE INVENTION

1. Field of the Invention

The present invention relates to a backlight assembly having improved color mixture and heat dissipation. The present invention also relates to a liquid crystal display device having the present backlight assembly.

2. Description of the Related Art

Since a liquid crystal display (LCD) device has a variety of advantages in terms of size, weight and power consumption, it has been widely used in a variety of files such as a laptop computer field, a personal computer field, and a monitor field.

Since an LCD device is not a light emissive display, it requires a backlight assembly that emits light to a liquid crystal panel.

The backlight assembly is classified according to the disposition of a light source. A backlight assembly may thus be classified as an edge-type or a direct-type backlight assembly. The edge-type backlight assembly includes a light guide plate and a light source disposed on a side surface of the light guide plate. The light guide plate guides the light emitted from the light source frontward. The direct-type backlight assembly includes a plurality of light sources formed on a rear surface of the liquid crystal panel. The light emitted from the light sources is directly emitted to the liquid crystal panel.

As a light source for the backlight assembly, an electroluminescent (EL), a cold cathode fluorescent lamp (CCFL), a hot cathode fluorescent lamp (HCFL), and a light emitting diode (LED) may be used.

The backlight assembly using the CCFL may be reduced in service life due to mercury filled in the CCFL, which can be easily coupled to metal to generate an amalgam. Furthermore, the luminance variation is so high according to the variation of the temperature. Furthermore, the mercury may cause environmental pollution.

To solve the above problems of the backlight assembly using the CCFL, the LED has been widely used as a light source for the backlight assembly.

In the backlight assembly using the LED, a plurality of LEDs is disposed on a bottom case at predetermined intervals. A variety of optical sheets for diffusing and focusing light are disposed above the LEDs.

A reflective plate is disposed in the rear of the LEDs.

The LEDs that are point light sources emit white light by a combination of red, green and blue LEDs or by white LEDs.

Since the LED is a point light source, there may be a luminance difference between areas where the LEDs are disposed and areas where the LEDs are not disposed. To prevent such luminance difference, a light mixing plate for generating white light by mixing red, green and blue lights is provided above the LEDs. Alternatively, the distance between the optical sheets and the LEDs must be increased.

However, when a light mixing plate is provided, the manufacturing cost and weight of the LCD device increases. Also, when the distance between the optical sheets and the LEDs increases, the overall thickness of the LCD device increases. As will be seen from a review of the present invention, it is possible to omit a light mixing plate from the LCD device according to the present invention.

In addition, heat generated from the LEDs may cause a reduction in the service life of the LCD device.

SUMMARY OF THE INVENTION

Accordingly, one aspect of the present invention is directed to a backlight assembly and an LCD device having the backlight assembly that substantially obviate one or more problems due to limitations and disadvantages of the related art.

An object of the present invention is to provide a backlight assembly in which the color mixture of light emitted from the LEDs is enhanced as well as an LCD device having the same backlight assembly. In one aspect of the invention, a light mixing plate may be omitted from the present LCD device.

Another object of the present invention is to provide a backlight assembly in which the heat dissipation efficiency is improved as well as an LCD device having the same backlight assembly.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a backlight assembly including: a bottom case; a plurality of printed circuit boards (PCBs) disposed on the bottom case, wherein substantially all of the PCBs have predetermined inclinations with respect to a front surface of the bottom case; and a plurality of LEDs (light emitting diodes) mounted on the PCBs.

In another aspect of the present invention, there is provided a liquid crystal display device including: a bottom case; a plurality of printed circuit boards (PCBs) disposed on the bottom case, wherein substantially all of the PCBs have predetermined inclinations with respect to a front surface of the bottom case; a plurality of LEDs (light emitting diodes) mounted on the PCBs; and a liquid crystal panel for displaying an image using the light emitted from the LEDs. In a preferred embodiment, the liquid crystal display device does not include a light mixing plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
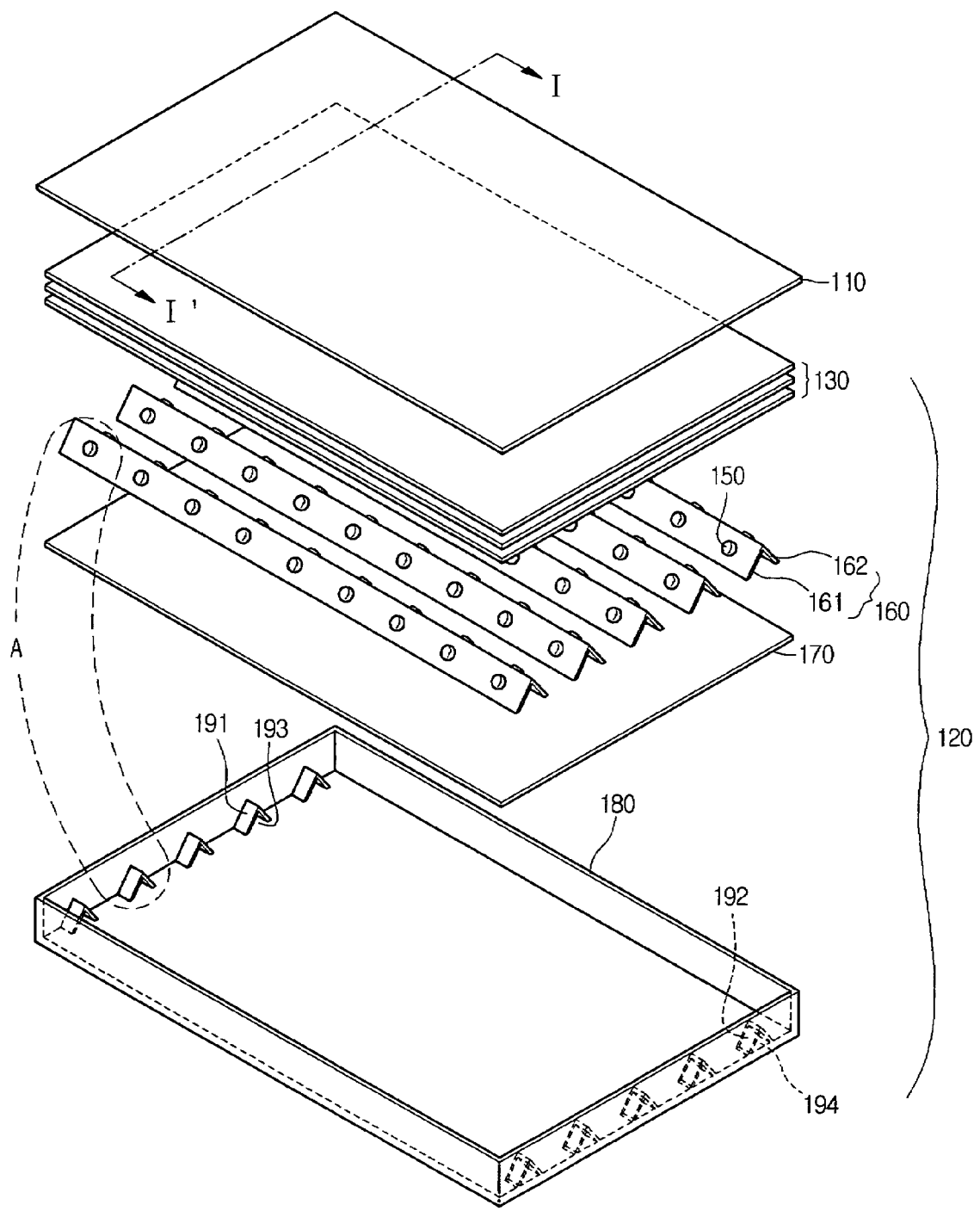
FIG. 1 is a perspective view of a direct-type LCD device according to an embodiment of the present invention.
Figure 2:
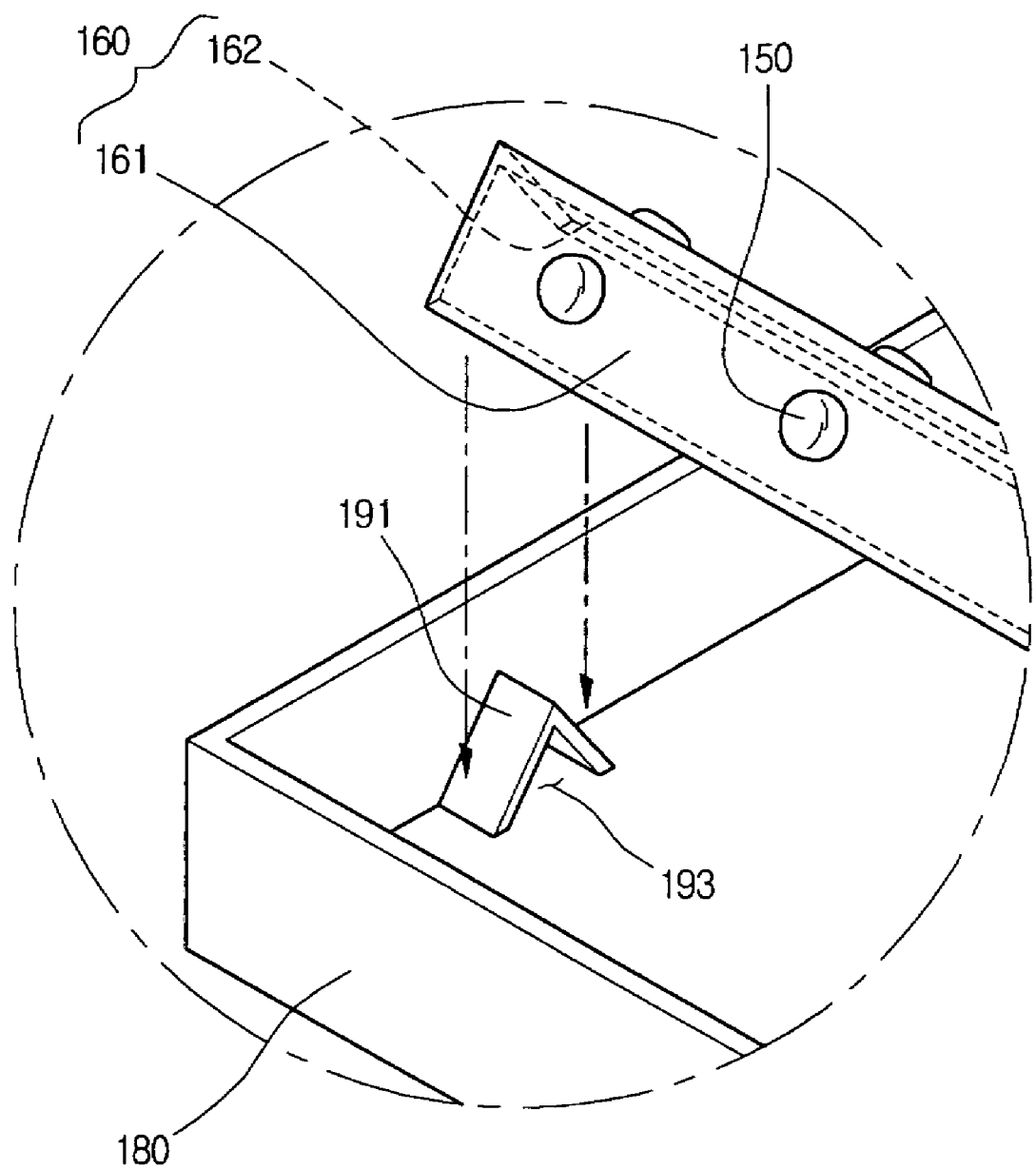
FIG. 2 is an enlarged view of portion A of FIG. 1.

FIG. 1 is a perspective view of a direct-type LCD device according to an embodiment of the present invention and FIG. 2 is an enlarged view of portion A of FIG. 1, illustrating an assembly of a bottom case and a PCB.

As shown in FIGS. 1 and 2, a direct-type LCD device of this embodiment includes a liquid crystal panel 110 and a backlight assembly 120 that emits light toward the liquid crystal panel 110.

The backlight assembly 120 includes a bottom case 180, a plurality of LEDs 150 disposed on the bottom case 180 and spaced apart from each other, a plurality of printed circuit boards (PCB) 160 disposed in rear of the LEDs 150, a reflective plate 170 disposed on rear surfaces of the PCBs 160, and a variety of optical sheets 130 disposed in front of the LEDs to diffuse and focus light.

The LEDs 150 may be red, green and blue LEDs. Alternatively, the LEDs 150 may be white LEDs emitting white light.

A conductive pattern to which a driving voltage for driving the LEDs 150 is formed on the PCBs 160.

Each of the PCBs 160 may be bent in a Λ-shape, such that it has a predetermined inclination with respect to the front surface of the bottom case 180. That is, each of the PCBs 160 may be divided into first and second substrates 161 and 162, respectively, with reference to the bent portion. The first and second substrates 161 and 162 are preferably substantially symmetrical with reference to the bent portion. For instance, according to one aspect of the present invention, all of the PCBs have predetermined inclinations with respect to a front surface of the bottom case. Preferably, each PCB is formed such that it has two inclines with respect to the front surface of the bottom. Illustratively, the inclines preferably form substantially equivalent angles on both sides of a direction perpendicular to the front surface of the bottom case.

That is, one longitudinal side of the first substrate 161 is directly connected to one longitudinal side of the second substrate 162, such that a predetermined angle between the first and second substrates 161 and 162 is formed.

The LEDs 150 are mounted on the first and second substrates 161 and 162.

The reason for bending the PCB 160, for instance in the Λ-shape, is to change the light path by disposing the LEDs with an inclination with respect to the front surface of the bottom case 180. Thus, the PCB 160 is bent at a predetermined angle such that the light incident angle is about 15 degrees to about 55 degrees, preferably about 35 degrees.

A plurality of first supports 191 are formed on a side edge of the bottom case 180 and a plurality of second supports 192 are formed on a side edge opposite to the first edge. The first and second supports 191 and 192 support the PCBs 160.

The first and second supports 191 and 192 may protrude in an inward direction of the bottom case 180. As a preferably way to support the PCBs 160, the first and second supports 191 and 192 may be bent in a Λ-shape.

A plurality of first holes 193 are defined between each of the first supports 191 and the bottom case 180. A plurality of second holes 194 are defined between each of the second supports 192 and the bottom case 180.

The first and second holes 193 and 194 are provided to dissipate heat. That is, the first and second holes 193 and 194 allow the rear surface of the PCBs 160 to contact air. The air, for instance, external air, circulates through the first or second holes 193 and 194 to dissipate the heat generated from the LEDs 150 and transferred to the PCBs 160. Additionally, the opposing side edges of the bottom case may be provided with air circulation holes formed between the front surface of the bottom case and the supports.

The first and second supports 191 and 192 and the first and second holes 193 and 194 may be integrally formed with the bottom case 180 through a press process of the bottom case 180.

Opposite ends of each PCB 160 are disposed on the first and second supports 191 and 192 are then fixed on the first and second supports 191 and 192 by, for example, screws.

Since the first and second substrates 161 and 162 of the PCB 160 are inclined with respect to the rear surface of the bottom case 180, the LEDs 150 mounted on the first and second substrates 161 and 162 are similarly inclined with respect to the rear surface of the bottom case 180.

The light generated from the LEDs 150 is emitted in a direction inclined from a direction perpendicular to the liquid crystal panel 110.

As the first and second supports 191 and 192 are formed on the bottom case 180, tunnel-shaped passages are defined by the first and second hole 193 and 194 and the rear surfaces of the PCBs 160.

As described above, since the LEDs 150 are mounted on the inclined first and second substrates 161 and 162 of the PCBs 160 bent, for instance in a Λ-shape, the light generated from the LEDs 150 travels in a direction inclined with respect to a direction normal to the liquid crystal panel 110. As the light is emitted in the inclined direction, the incident distance of the light on the optical sheets 130 increases and thus the light color mixture can be improved. In the LCD device of this embodiment, since the mixture of the red, green and blue light of the LEDs 150 can be improved, the distance from the optical sheets 130 to the LEDs 150 can be reduced. As a result, the LCD device can be thinner. Additionally, due to the improvement in the mixture of the LED light, it is possible to omit a light mixing plate from the present LCD device, if desired.

In addition, since the first and second holes 193 and 194 are formed around the first and second supports 191 and 192 of the bottom case 180, air, for instance external air, can contact the rear surfaces of the PCBs 160 after passing through the first and second holes 193 and 194. As a result, the heat transferred from the LEDs 150 to the PCBs 160 can be effectively dissipated.

Figure 3:
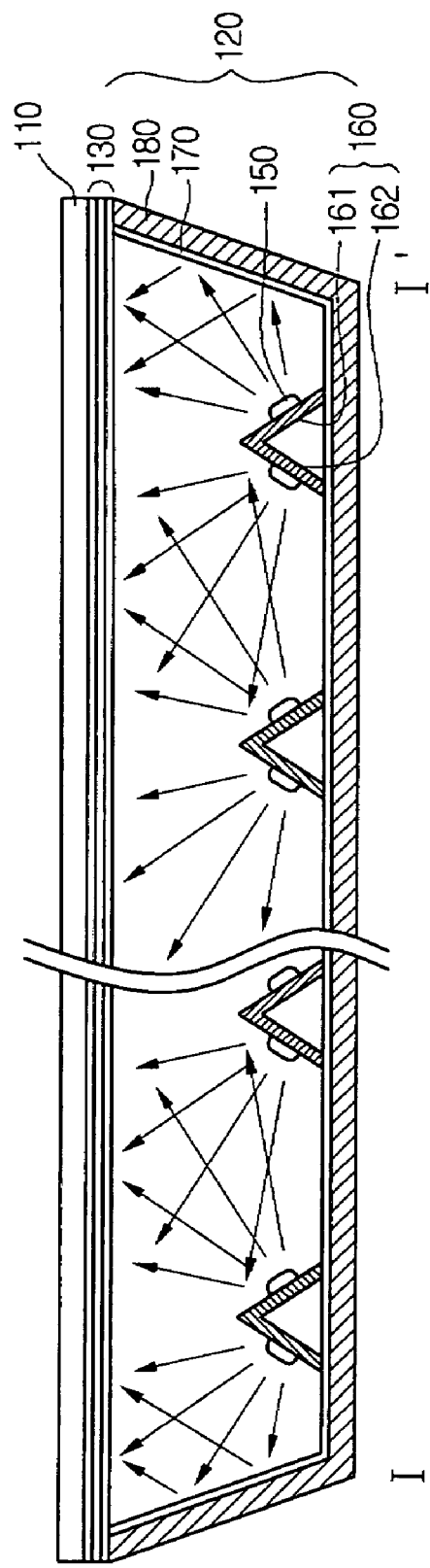
FIG. 3 is a sectional view taken along line I-I' of FIG. 1.

FIG. 3 is a sectional view taken along line I-I' of FIG. 1.

As shown in FIG. 3, the PCB 160 is bent in the Λ-shape and divided into the first and second substrates 161 and 162 with reference to the bent portion. The LEDs 150 are mounted on the first and second substrates 161 and 162.

The LEDs 150 include red, green and blue LEDs mounted on the first and second substrates 161 and 162 that are inclined from the front surface of the bottom case 180. Therefore, the LEDs are arranged to be inclined from the front surface of the bottom case 180.

The light generated from the LEDs 150 is emitted in an inclined direction due to the inclination of the LEDs 150. Therefore, the incident distance from the LEDs 150 to the optical sheets 130 increases. Therefore, the mixture of the red, green and blue light can be enhanced.

Since the mixture of the red, green and blue light can be enhanced, the distance between the optical sheets 130 to the LEDs 150 can be reduced. Additionally, it is possible to omit a light mixing plate from the present LCD device, if desired.

Figure 4:
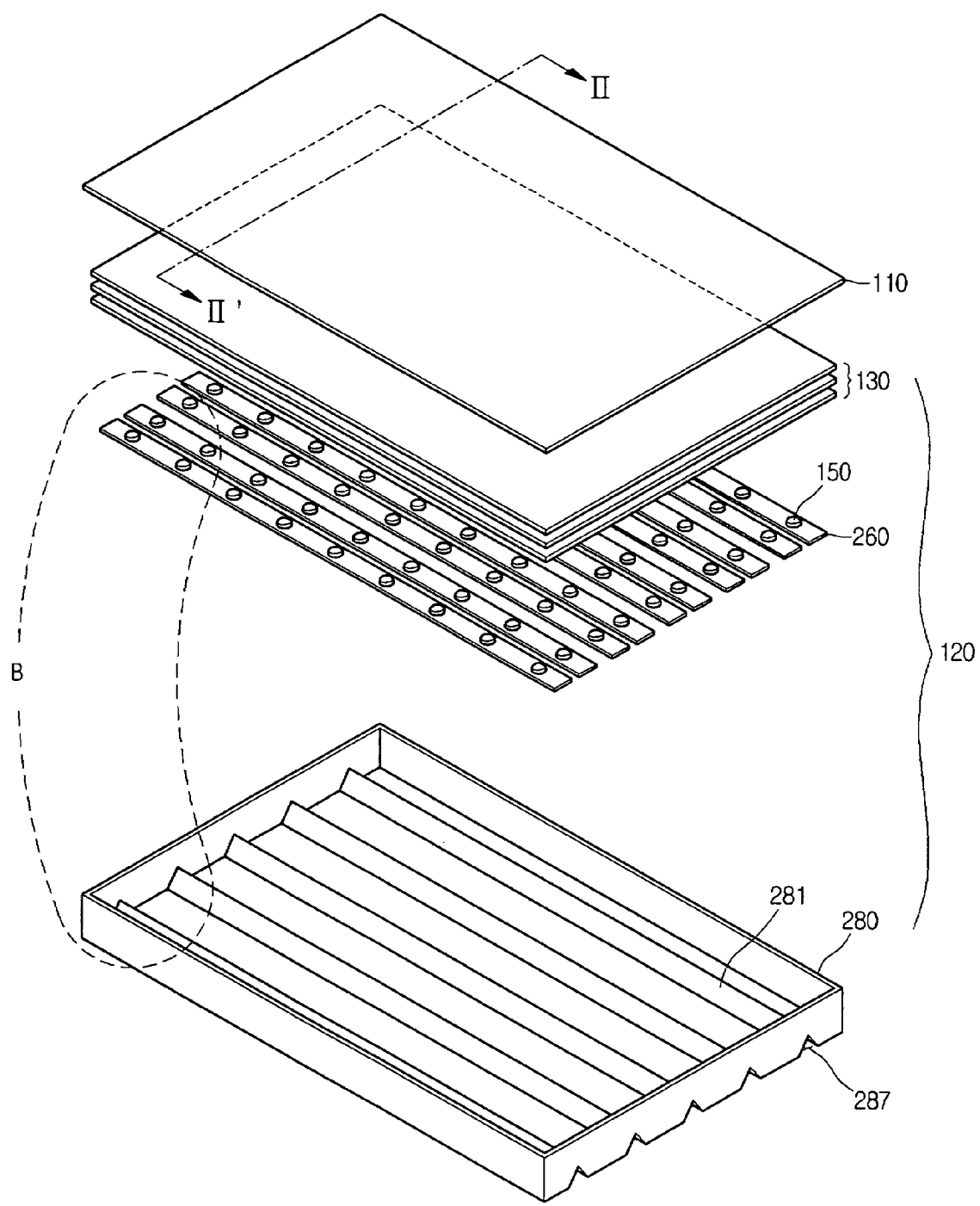
FIG. 4 is a perspective view of a direct-type LCD device according to another embodiment of the present invention.
Figure 5:
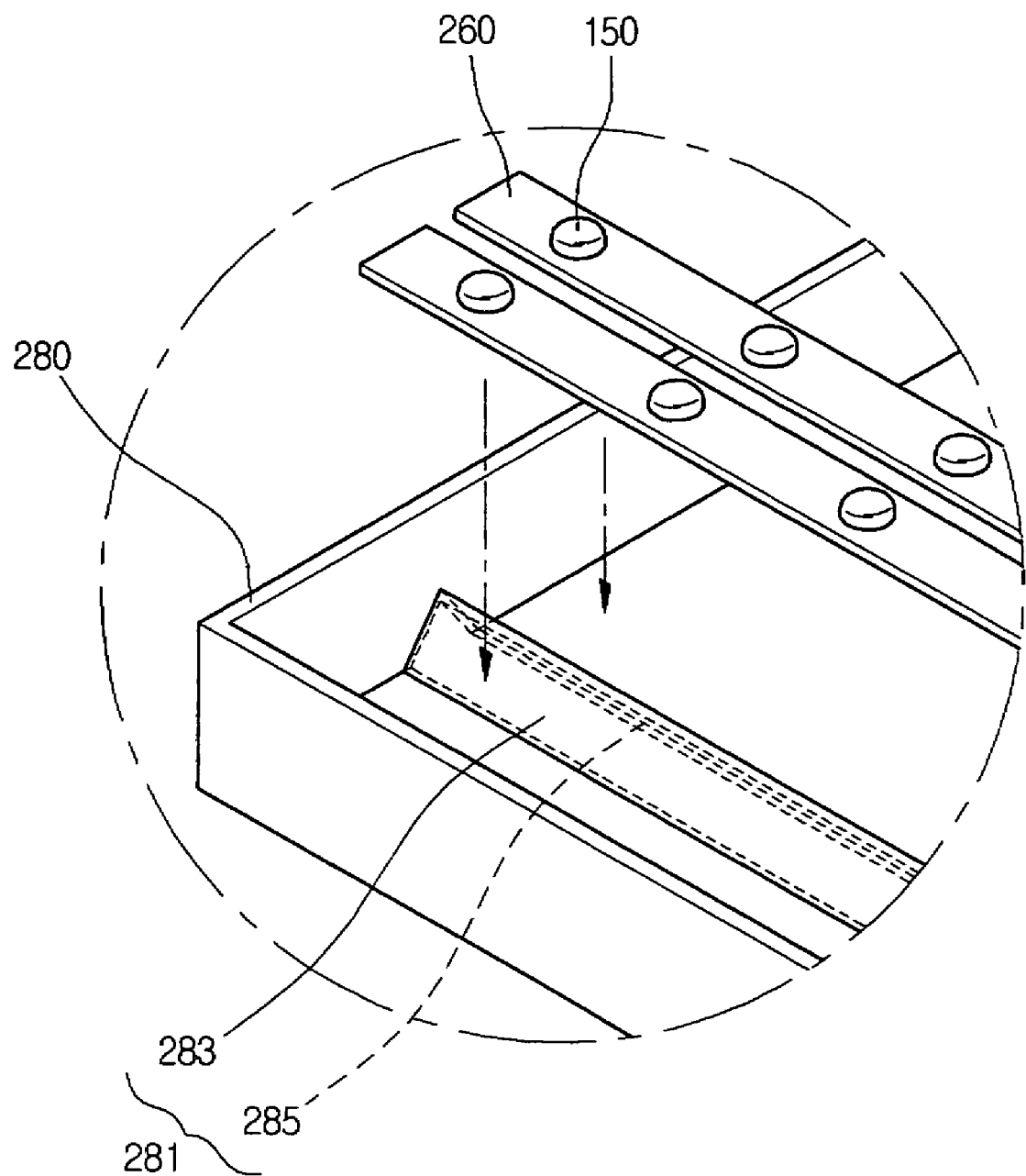
FIG. 5 is an enlarged view of portion B of FIG. 4.

FIG. 4 is a perspective view of a direct-type LCD device according to another embodiment of the present invention and FIG. 5 is an enlarged view of a portion B of FIG. 4; and As shown in FIGS. 4 and 5, a direct-type LCD device of this embodiment is identical to that of FIGS. 1 through 3 except for the PCBs and bottom case. Therefore, the description of the identical parts will be omitted herein and the same reference numbers will be applied thereto.

A plurality of PCBs 260 is arranged on the bottom case 280 at predetermined intervals. A plurality of LEDs 150 such as red, green, blue and/or white LEDs is mounted on the PCBs 260.

The bottom case 280 provides a predetermined inner space. A plurality of protrusions 281 is formed on an inner-front surface of the bottom case 280.

The protrusions 281 extend from one side to the other of the bottom case 280.

The protrusions 281 may be integrally formed with the bottom case 280 through a press process.

Each of the protrusions 281 has first and second inclined supporting surfaces 283 and 285. That is, the protrusion is prismatic.

Grooves 287 corresponding to the protrusions 281 are formed on a rear surface of the bottom case 280. The grooves 287 may be formed during the press process for forming the protrusions 281.

The first and second inclined supporting surfaces 283 and 285 are substantially symmetrical with reference to a peak thereof. The inclination of the first and second inclined supporting surfaces 283 may be properly set according to the size of the LCD device and the type of LEDs 150.

The PCBs 260 are disposed and fixed on the first and second inclined supporting surfaces 283 and 285 by, for example, screws.

Since the PCBs 260 are disposed and fixed on the first and second inclined supporting surfaces 283 and 285, the PCBs 260 are inclined with respect to the flat front surface of the bottom case 280. Therefore, the LEDs 150 mounted on the PCBs 260 are also inclined with respect to the flat front surface of the bottom case 280.

That is, the reason for forming the protrusions 281 is to allow the LEDs 150 to be inclined with respect to the front surface of the bottom case 280.

Accordingly, the light generated from the LEDs 150 is emitted in a direction inclined with respect to a direction normal to the liquid crystal panel 110.

In the direct-type LCD device according to this embodiment, in order to dispose the LEDs with a predetermined inclination, the prismatic protrusions 281 are formed on the bottom case 280. Therefore, the light generated from the LEDs 150 travels in a direction inclined with respect to a direction normal to the liquid crystal panel 110. Since the light is emitted in an inclined direction, the incident distance of the light from the LEDs to the optical sheets 130 increases and thus the light color mixture can be improved. In the LCD device of this embodiment, since the mixture of the red, green and blue light of the LEDs 150 can be improved, the distance from the optical sheets 130 to the LEDs 150 can be reduced. As a result, the LCD device can be made thinner. Additionally, a light mixing plate may be omitted, if desired.

In addition, since the grooves 287 of the bottom case 280 increase the surface area contacting the external air and thus the heat transferred from the LEDs 150 to the PCBs 260 can be effectively dissipated.

Figure 6:
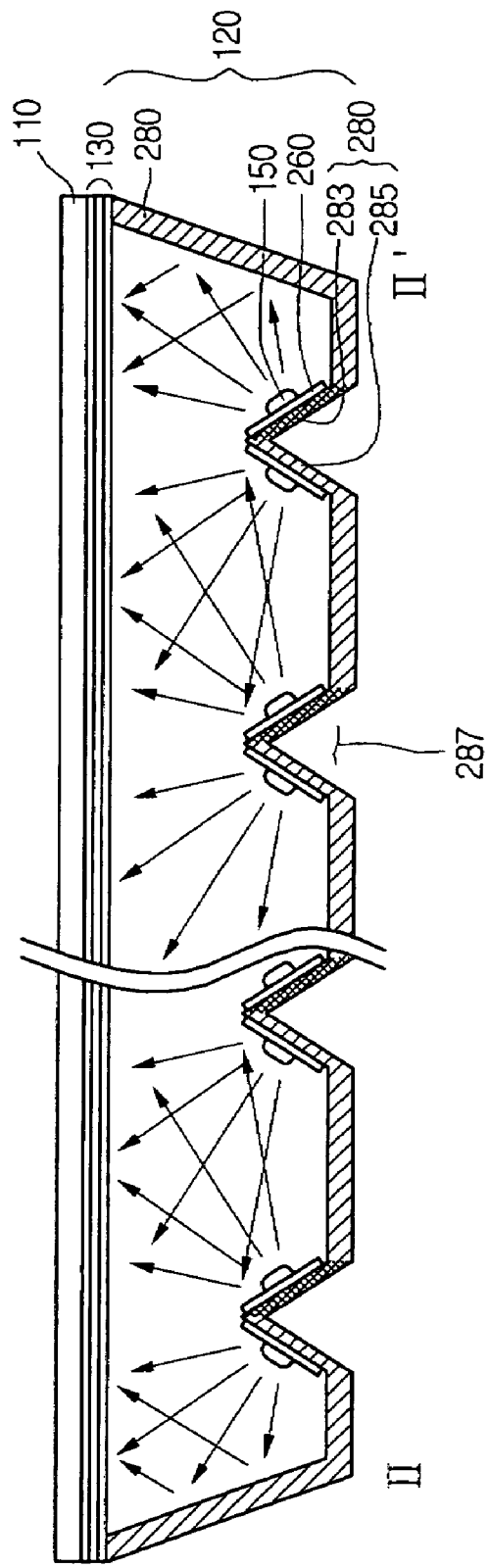
FIG. 6 is a sectional view taken along line II-II' of FIG. 4.

FIG. 6 is a sectional view taken along line II-II' of FIG. 4.

As shown in FIG. 6, the light generated from the LEDs 150 is emitted in an inclined direction due to the inclination of the LEDs 150. Therefore, the incident distance from the LEDs 150 to the optical sheets 130 increases.

Therefore, the mixture of the red, green and blue light emitted from the LEDs 150 can be enhanced. Since the mixture of the red, green and blue light can be enhanced, the distance between the optical sheets 130 to the LEDs 150 can be reduced. Additionally, a light mixing plate may be omitted from the present LCD device, if desired.

In addition, since the grooves 287 are formed on the rear surface of the bottom case 280, the surface area contacting air, for instance external air, increases and thus the heat generated from the LEDs 150 can be effectively dissipated.

According to the present invention, since the LEDs are disposed with a predetermined inclination, the mixture of the light colors can be improved and thus the distance between the optical sheets and the LEDs can be reduced. This makes the LCD device slimmer.

In addition, holes formed on the side portion of the bottom case increase the heat dissipation efficiency by allowing external air to contact the rear surface of the PCBs.

Furthermore, the prismatic protrusions allow the LEDs to be disposed with a predetermined inclination, thereby improving the color mixture.

The grooves formed on the rear surface of the bottom case improve the heat dissipation efficiency by increasing the surface area contacting air, for instance external air.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight assembly comprising:
   a bottom case containing a bottom plate with first and second opposing side edges extending upwards from the bottom plate, wherein the bottom plate has a plurality of first inverted V-shaped supports formed at the first side edge and a plurality of second inverted V-shaped supports formed at the second side edge, said first V-shaped supports opposed to said second V-shaped supports;
   a plurality of inverted V-shaped printed circuit boards (PCBs) disposed within the bottom case, each of said inverted V-shaped printed circuit boards extending from the first side edge to the second side edge and having a first end supported by one of said first inverted V-shaped supports and a second end supported by one of said second inverted V-shaped supports; and
   a plurality of light emitting diodes (LEDs) mounted on the inverted V-shaped PCBs,
   wherein the first and second inverted V-shaped supports extend inward from the respective side edges with a length sufficient to support respective end portions of the inverted V-shaped printed circuit boards, the first and second side edges of the bottom case are provided with air circulation holes formed adjacent each of the inverted V-shaped supports, and said air circulation holes extend through the side edges so that external air contacts a rear surface of each inverted V-shaped printed circuit board.

2. A liquid crystal display device comprising the backlight assembly of claim 1 and a liquid crystal panel for displaying an image using the light emitted from the LEDs.

3. The backlight assembly according to claim 1, wherein all of the PCBs have predetermined inclinations with respect to a front surface of the bottom case.

4. The backlight assembly according to claim 1, wherein each PCB is formed such that it has two inclines with respect to the front surface of the bottom.

5. The backlight assembly according to claim 4, wherein said inclines form substantially equivalent angles on both sides of a direction perpendicular to the front surface of the bottom case.

6. The backlight assembly according to claim 1, wherein the LEDs are red, green and blue LEDs.

* * * * *